United States Patent
Yamada (10) Patent No.: US 9,783,202 B2
(45) Date of Patent: Oct. 10, 2017

(54) VEHICLE OCCUPANT INFORMATION ACQUISITION DEVICE AND VEHICLE CONTROL SYSTEM

(71) Applicant: TOYOTA JIDOSHA KABUSHIKI KAISHA, Toyota-shi, Aichi-ken (JP)

(72) Inventor: Yoshinori Yamada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/182,822

(22) Filed: Jun. 15, 2016

(65) Prior Publication Data

US 2017/0028987 A1 Feb. 2, 2017

(30) Foreign Application Priority Data

Jul. 27, 2015 (JP) ................................. 2015-147840

(51) Int. Cl.
*B60W 30/182* (2012.01)
*B60W 40/08* (2012.01)
(Continued)

(52) U.S. Cl.
CPC ......... *B60W 30/182* (2013.01); *B60K 28/066* (2013.01); *B60N 2/01* (2013.01);
(Continued)

(58) Field of Classification Search
CPC .... B60W 30/182; B60W 40/08; B60W 50/08; B60W 50/14; B60W 2050/143; B60W 2040/0809; B60W 2040/0872; B60W 2540/28; B60W 2540/24; B60W 2540/26; B60W 2540/22; B60W 2540/30; B60W 2040/0836; B60W 2040/0827;
(Continued)

(56) References Cited

U.S. PATENT DOCUMENTS

| 826,048 | A | * | 7/1906 | Szybalski et al. ..... H01H 29/30 337/321 |
| 8,260,482 | B1 | | 9/2012 | Szybalski et al. |
| 2016/0159251 | A1 | | 6/2016 | Ebina et al. |

FOREIGN PATENT DOCUMENTS

DE 4226747 C1 * 12/1993
DE 4226747 C1 12/1993
(Continued)

OTHER PUBLICATIONS

Dec. 9, 2016 Search Report issued in European Application No. 16177500.2.

*Primary Examiner* — Brian P Sweeney
(74) *Attorney, Agent, or Firm* — Oliff PLC (57) ABSTRACT

A vehicle occupant information acquisition device includes a microcomputer, an acquisition unit and an alert unit. The microcomputer controls the vehicle to switch between an autonomous driving mode and a manual driving mode. The acquisition unit acquires, from vehicle occupants riding in the vehicle, information relating to driving suitability of the vehicle occupants. In a case in which the microcomputer is switching the vehicle from the autonomous driving mode to the manual driving mode, the microcomputer causes the alert unit to alert one of the vehicle occupants who is determined to be suitable to drive the vehicle based on the information acquired by the acquisition unit that he/she has been selected as the driver of the vehicle.

13 Claims, 10 Drawing Sheets

(51) Int. Cl.
*B60W 50/14* (2012.01)
*B60N 2/02* (2006.01)
*B60W 50/08* (2012.01)
*B60K 28/06* (2006.01)
*B60N 2/01* (2006.01)
*B60N 2/06* (2006.01)
*B60N 2/07* (2006.01)
*G05D 1/00* (2006.01)
*G06K 9/00* (2006.01)

(52) U.S. Cl.
CPC ......... *B60N 2/0244* (2013.01); *B60N 2/0292* (2013.01); *B60N 2/06* (2013.01); *B60N 2/0745* (2013.01); *B60W 40/08* (2013.01); *B60W 50/08* (2013.01); *B60W 50/14* (2013.01); *G05D 1/0061* (2013.01); *G06K 9/00845* (2013.01); *B60W 2040/0809* (2013.01); *B60W 2040/0827* (2013.01); *B60W 2040/0836* (2013.01); *B60W 2040/0872* (2013.01); *B60W 2050/143* (2013.01); *B60W 2540/22* (2013.01); *B60W 2540/24* (2013.01); *B60W 2540/26* (2013.01); *B60W 2540/28* (2013.01); *B60W 2540/30* (2013.01)

(58) Field of Classification Search
CPC ...... G05D 1/0061; B60N 2/0745; B60N 2/06; B60N 2/0244; B60N 2/01; B60N 2/0292; B60K 28/066; G06K 9/00845
USPC .......................................................... 701/48
See application file for complete search history.

(56) References Cited

FOREIGN PATENT DOCUMENTS

| | | |
|---|---|---|
| JP | 2006-096220 A | 4/2006 |
| JP | 2009-254544 A | 11/2009 |
| WO | 2014/068892 A1 | 5/2014 |
| WO | 2014/128273 A1 | 8/2014 |
| WO | 2015/011866 A1 | 1/2015 |

\* cited by examiner

| DETERMINATION CONDITION | METHOD OF DETECTION | EVALUATION VALUE |
|---|---|---|
| WHETHER OR NOT HAS A DRIVER'S LICENSE | DATABASE | EXCLUDE OCCUPANTS WHO HAVE NO DRIVER'S LICENSE |
| WHETHER OR NOT OCCUPANT HAS BEEN DRINKING ALCOHOL | ALCOHOL SENSOR | EXCLUDE OCCUPANTS WHO HAVE BEEN DRINKING ALCOHOL |
| PHYSICAL CONDITION | HEART RATE SENSOR CAMERA | GOOD: 5 POINTS |
| | | OTHER: 0 POINTS |
| FACING DIRECTION AND POSITION OF SEAT | CAMERA STATE OF CONTROL OF SEAT | FACING FORWARD, D SIDE,REAR: 5POINTS |
| | | FACING FORWARD, P SIDE,REAR: 3POINTS |
| | | FACING REARWARD: 1 POINT |
| DRIVING SKILLS RELATING TO TRAVEL ROUTE | DATABASE | SKILLFUL: 2 POINTS |
| | | NORMAL: 1 POINTS |
| | | POOR: 0 POINTS |
| DRIVING DISTRIBUTION | DATABASE | HAS NOT DRIVEN: 2 POINTS |
| | | HAS DRIVEN: 0 POINTS |
| WHETHER OR NOT OCCUPANT WANTS TO DRIVE | OPERATIONAL INPUT, MICROPHONE | WANTS TO DRIVE: 5 POINTS |
| | | DOES NOT WANT TO DRIVE: 0 POINTS |

| CONDITION | "A" | "B" | "C" | "D" |
|---|---|---|---|---|
| WHETHER OR NOT OCCUPANT HAS A DRIVER'S LICENSE | YES: 0 POINTS | YES: 0 POINTS | YES: 0 POINTS | NO: -1 POINTS |
| WHETHER OR NOT OCCUPANT HAS BEEN DRINKING ALCOHOL | NO PROBLEM: 0 POINTS | NO PROBLEM: 0 POINTS | NO PROBLEM: 0 POINTS | NO PROBLEM: 0 |
| PHYSICAL | GOOD: 5 POINTS | GOOD: 5 POINTS | TIRED: 0 POINTS | GOOD: 5 POINTS |
| FACING DIRECTION AND POSITION OF SEAT | FACING FORWARD, D SIDE, REAR: 5 POINTS | FACING FORWARD, P SIDE, REAR: 3 POINTS | FACING REARWARD, D SIDE, FRONT: 1 POINTS | FACING REARWARD, P SIDE, FRONT: 1 POINTS |
| DRIVING SKILL RELATING TO TRAVEL ROUTE | NORMAL: 1 POINTS | SKILLFUL: 2 POINTS | SKILLFUL: 2 POINTS | POOR: 0 POINTS |
| DRIVING DISTRIBUTION | YET TO DRIVE: 2 POINTS | YET TO DRIVE: 2 POINTS | ALREADY DRIVEN: 0 POINTS | YET TO DRIVE: 2 POINTS |
| WHETHER OR NOT OCCUPANT WANTS TO DRIVE | WILLING: 5 POINTS | WILLING: 5 POINTS | UNWILLING: 0 POINTS | UNWILLING: 0 POINTS |
| EVALUATION RESULT: EVALUATION VALUE | FIRST PLACE: 18 POINTS | SECOND PLACE: 17 POINTS | THIRD PLACE: 3 POINTS | EXCLUDED |

VEHICLE OCCUPANT INFORMATION ACQUISITION DEVICE AND VEHICLE CONTROL SYSTEM

CROSS-REFERENCE TO RELATED APPLICATION

This application claims priority under 35 USC 119 from Japanese Patent Application No. 2015-147840, filed on Jul. 27, 2015, the disclosure of which is incorporated by reference herein.

BACKGROUND

Technical Field

The present disclosure relates to a vehicle occupant information acquisition device and a vehicle control system that acquire information regarding vehicle occupants.

Related Art

There are technologies by which seat arrangements, which are the positions and facing directions or the like of plural seats installed in an automobile, can be changed into various arrangements.

For example, Japanese Patent Application Laid-Open (JP-A) No. 2006-96220 discloses setting a seat arrangement in accordance with a person who requires assistance. In specific terms, when operations of an automatic seat arrangement device are started up, luggage information is read from IC tags or the like by a reader device. Then, taking into account equipment information relating to seats, such as whether a child seat is equipped and the like, human body characteristics are determined, including whether each vehicle occupant is a person who requires assistance or an able-bodied person. On the basis of the determination results, an optimum seat arrangement is specified. If an occupant is a person who requires assistance, automatic seat arrangement is implemented before seating, triggered by opening of a door, and notice is given of this implementation. If an occupant is an able-bodied person, an automatic seat arrangement is implemented if an operation button is pressed within a predetermined time period after the occupant sits down.

In recent years, various technologies relating to autonomous driving have been proposed. Technologies have been disclosed that enable a seat arrangement in which a seat on which a driver is sitting is oriented the opposite way to a vehicle progress direction (oriented rearward) during autonomous driving mode. In this seat arrangement, an occupant on a seat at the vehicle rear side and the driver are in a mutually facing seating state.

However, in an autonomous driving mode in which mutually facing seating is enabled, if the seat on which the driver is sitting is turned to be oriented to the vehicle progress direction, when the vehicle switches from autonomous driving mode to manual driving mode, it takes time for the driver to switch their mental attitude and their postural attitude and to become acquainted with the movements and situation of the vehicle. Therefore, when the vehicle switches to manual driving mode, the occupant sitting on the driving seat may not be ready to be a driver.

There are further situations in which the condition of a driver may not be suitable for driving such as, for example, the driver not being in a wakeful state during autonomous driving mode and the like.

SUMMARY

The present disclosure provides a vehicle occupant information acquisition device and a vehicle control system that may enable a vehicle occupant having a driving suitability to drive, when switching from autonomous driving mode to manual driving mode.

A first aspect is a vehicle occupant information acquisition device including: a microcomputer configured to control a vehicle to switch between an autonomous driving mode and a manual driving mode of the vehicle; an acquisition unit that acquires, from vehicle occupants riding in the vehicle, information relating to driving suitability of the vehicle occupants, the information being supplied to the microcomputer; and an alert unit coupled to and controlled by the microcomputer, wherein in a case in which the microcomputer is switching the vehicle from the autonomous driving mode to the manual driving mode, the microcomputer causes the alert unit to alert one of the vehicle occupants who is determined to be suitable to drive the vehicle based on the information acquired by the acquisition unit that the one of the vehicle occupants has been selected as the driver of the vehicle in the manual driving mode.

According to the first aspect, the vehicle is switched between the autonomous driving mode and the manual driving mode by the microcomputer.

The acquisition unit acquires various kinds of information relating to the driving suitability of each occupant among the occupants riding in the vehicle. For example, the acquisition unit uses various sensors, cameras and the like to acquire information relating to the occupant from the occupant.

In a case in which the microcomputer is switching the vehicle from the autonomous driving mode to the manual driving mode, based on the information acquired by the acquisition unit, the alert unit is controlled to alert an occupant among the riding occupants who is suitable to drive. Thus, in a case in which the microcomputer switches the vehicle to the manual driving mode, by the alert unit alerting the occupant who is suitable to drive, the first aspect may enable an occupant having driving suitability to drive. Furthermore, in the first aspect, by the occupant who has been alerted performing driving, the switch from the autonomous driving mode to the manual driving mode may be implemented safely.

A second aspect includes the above first aspect, wherein the information relating to driving suitability of the vehicle occupants acquired by the acquisition unit includes at least one of: personal information including whether or not the vehicle occupants are licensed to drive; information representing a state of alcoholic influence of the vehicle occupants; information representing a state of physical condition of the vehicle occupants; driving skill information of the vehicle occupants; driving history information of the vehicle occupants; information representing a driving distribution of the vehicle occupants; and information on willingness of the vehicle occupants to drive. By using one or more of these items of information, the second aspect may alert an occupant who is suitable to drive.

A third aspect includes the above aspects, wherein the microcomputer determines the one of the vehicle occupants who is suitable to drive by using pre-specified evaluation values to evaluate the information acquired by the acquisition unit. By using these pre-specified evaluation values, the third aspect may easily select and alert an occupant who is suitable to drive.

A fourth aspect includes the aspects described above, and may further include a detector configured to detect respective positions and facing directions of a plural number of seats of the vehicle whose positions and facing directions relative to the vehicle are respectively changeable, wherein, in a case in which the microcomputer is switching the vehicle from the autonomous driving mode to the manual driving mode, the microcomputer causes the alert unit to alert the one of the vehicle occupants who is suitable to drive based on the information acquired by the acquisition unit and detection results of the detector. Thus, the fourth aspect may alert an occupant who is suitable to drive taking into account the positions and facing directions of the seats during the autonomous driving mode.

A fifth aspect is a vehicle control system including: a vehicle occupant information acquisition device according to the fourth aspect; and a changing unit that changes the respective positions and facing directions of the plurality of seats; wherein the microcomputer controls the changing unit so as to set a seat on which the one of the vehicle occupants determined to be suitable to drive is sitting to a position and facing direction suitable for driving.

According to the fifth aspect, the changing unit is provided in addition to the vehicle occupant information acquisition device of the fourth aspect.

The changing unit changes the respective positions and facing directions of the plurality of seats. In other words, the seat arrangement can be changed by the changing unit.

The microcomputer controls the changing unit such that the seat on which the occupant who is suitable to drive, who is selected by the microcomputer, is sitting is changed to a position and facing direction suitable for driving. Thus, in a case in which there is a switch from the autonomous driving mode to the manual driving mode in the fifth aspect, an occupant who is suitable to drive may be put into a state in which they can drive. Thus, the switch from the autonomous driving mode to the manual driving mode may be implemented safely.

As described above, according to the above aspects, a vehicle occupant information acquisition device and vehicle control system may be provided that may enable a vehicle occupant who has driving suitability to drive the vehicle when switching from autonomous driving mode to manual driving mode.

BRIEF DESCRIPTION OF THE DRAWINGS

Exemplary embodiments will be described in detail based on the following figures, wherein.

DETAILED DESCRIPTION

Figure 1:
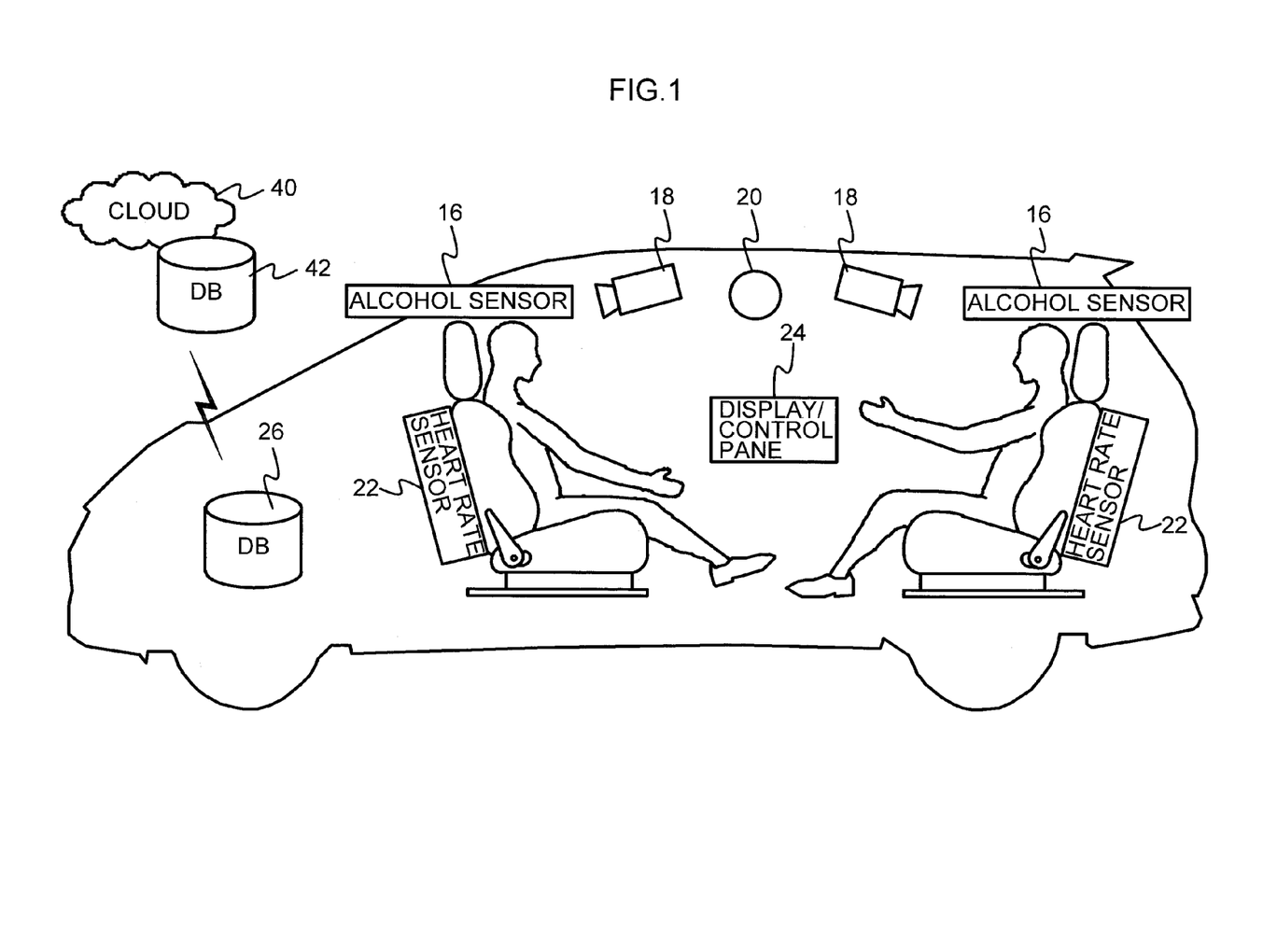
FIG. 1 is a side view showing schematic structures of a vehicle including a vehicle occupant information acquisition device in accordance with a present exemplary embodiment.
Figure 2:
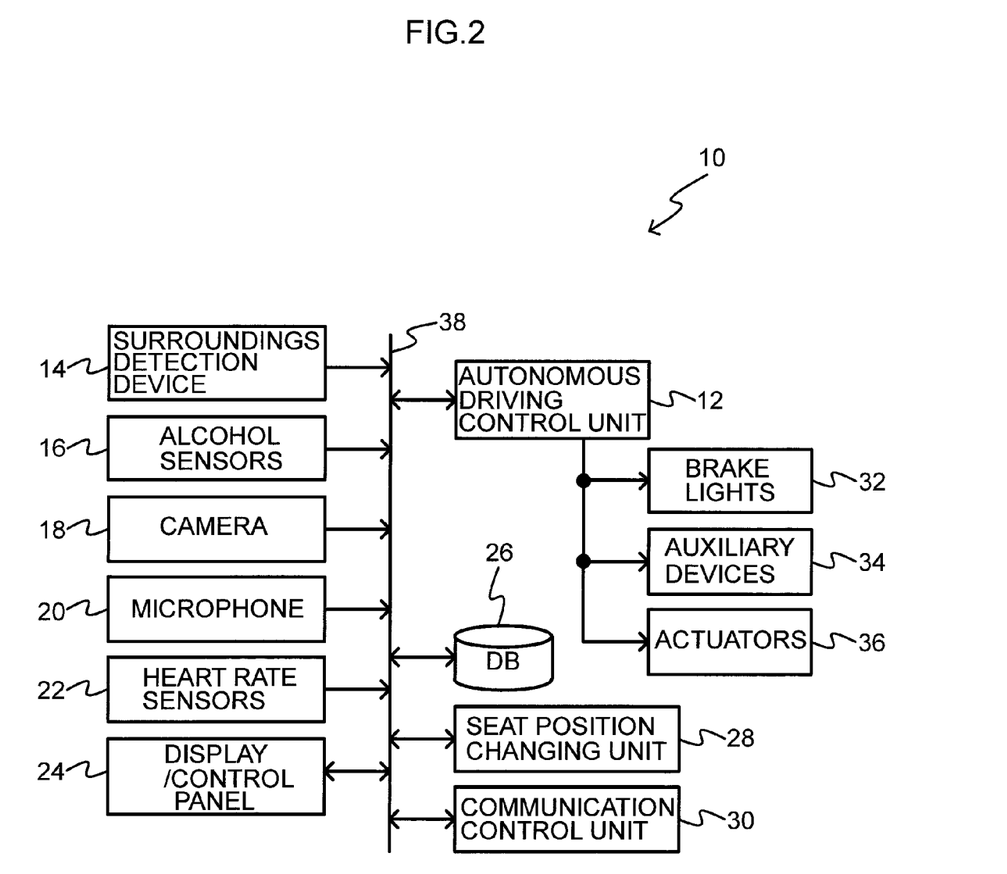
FIG. 2 is a block diagram showing schematic structures of the vehicle occupant information acquisition device in accordance with the present exemplary embodiment.

Herebelow, an example of an exemplary embodiment of the present disclosure is described in detail with reference to the attached drawings. FIG. 1 is a side view showing a vehicle including a vehicle occupant information acquisition device in accordance with a present exemplary embodiment, and FIG. 2 is a block diagram showing schematic structures of the vehicle occupant information acquisition device in accordance with the present exemplary embodiment.

As shown in FIG. 1, a plural number (four in the present exemplary embodiment) of seats are provided in the vehicle. Positions and facing directions of the seats relative to the vehicle can be changed. By the positions and facing directions of the seats being changed, seat arrangements can be changed. FIG. 1 shows an example of a seat arrangement in which a seat at the vehicle front side is changed to face rearward.

An acquisition unit is provided in the vehicle in order to acquire various kinds of information about vehicle occupants from the occupants. The information serves as conditions for determining whether or not each occupant is suitable for being the driver. Alcohol sensors 16, cameras 18, a microphone 20, heart rate sensors 22, a display/control panel 24 and a database (DB) 26 serve as the acquisition unit. The database 26 encompasses smartphones, smart watches and the like belonging to individuals.

Each alcohol sensor 16 is disposed at a position at which the breath of an occupant can be easily detected such as, for example, a headrest or the like. By detecting alcohol, the alcohol sensor 16 determines whether or not an occupant sitting on a seat is under the influence of alcohol.

The cameras 18 are disposed at the ceiling of a vehicle cabin interior or the like, from where facial expressions and the like of the occupants sitting on the seats can be imaged. Each camera 18 captures images of an occupant. In the present exemplary embodiment, the captured images obtained by the imaging are used for determining states of physical condition and the like from facial coloration, expressions and the like of the occupants. The captured images may also be used for facial recognition and the like in order to identify the occupants in the vehicle.

The microphone 20 is disposed at a location at which sounds produced by occupants sitting on the seats can be detected. The microphone 20 detects the voices of the occupants. In the present exemplary embodiment, whether or not an occupant is willing to drive is detected by the occupant saying whether or not they are willing to drive into the microphone 20. The microphone 20 may also be used for voice authentication, the entry of various kinds of information and so forth by voice recognition and the like.

Each heart rate sensor 22 is disposed in a seat or the like and detects the heart rate of an occupant. In the present exemplary embodiment, states of physical condition of the occupants may be determined by detecting heart rates with the heart rate sensors 22.

The display/control panel 24 is disposed at, for example, a center console region of the vehicle cabin interior or the like. The display/control panel 24 is disposed at a position at which displays can be seen and operations can be performed by occupants sitting on the seats. The display/control panel 24 is provided with buttons, switches and the like for entering various kinds of information. The display/control panel 24 is also provided with a display unit such as a monitor or the like that displays various kinds of information and serves as an alert unit. A touch panel or the like in which the display unit and an operation unit are integrated may be employed as the display/control panel 24.

The database 26 memorizes information entered by operations of the display/control panel 24 by the occupants and the like in the form of a database. For example, the database 26 memorizes various kinds of personal information such as whether or not a person is licensed to drive, individual characteristics, preferences, driving distribution, driving skills and the like. Information on driving distribution, driving skills and the like that is memorized in the database 26 is rewritten by continuous feedback to the database 26. As illustrated in FIG. 1, the information in the database 26 may be acquired from information that is memorized in a database 42 at a server of an external cloud 40 or the like. Further, information may be acquired from the database 42 of the cloud 40 and memorized in the database 26.

As shown in FIG. 2, the alcohol sensors 16, cameras 18, microphone 20, heart rate sensors 22, display/control panel 24 and database 26 are respectively connected to an on-board network 38.

An autonomous driving control unit 12, a surroundings detection device 14, a seat position changing unit 28 and a communications control unit 30 are also connected to the on-board network 38. The autonomous driving control unit 12 serves as a driving control unit and a control unit. The seat position changing unit 28 serves as a changing unit. The autonomous driving control unit 12 and the display/control panel 24 correspond to the alert unit.

The autonomous driving control unit 12 is constituted by a microcomputer (Electronic Control Unit (ECU)) including a central processing unit (CPU), a read-only memory (ROM), a random access memory (RAM) and the like. Brake lights 32, auxiliary devices 34 (for example, indicator lights, front lights, a wiper device and the like), actuators 36 and so forth are connected to the autonomous driving control unit 12. The autonomous driving control unit 12 loads a program memorized in advance in the ROM into the RAM and executes the program at the CPU. Thus, the autonomous driving control unit 12 controls autonomous driving by controlling operations of the brake lights 32, the auxiliary devices 34, the actuators 36 and the like. The autonomous driving control unit 12 may be configured by plural electronic control units.

To be specific, the autonomous driving control unit 12 performs control to switch between autonomous driving mode, in which the autonomous driving control unit 12 determines surroundings of the vehicle and conditions of the vehicle and controls the vehicle, and manual driving mode in which the vehicle is driven by an occupant. During autonomous driving mode, to enable the vehicle to run independently, the autonomous driving control unit 12 determines conditions of the vehicle itself and the vehicle's surroundings on the basis of information acquired from the surroundings detection device 14, which includes various sensors, surroundings imaging cameras and the like. In response to the judgment results, the autonomous driving control unit 12 executes autonomous driving control processing that controls the actuators 36 to control acceleration amounts, braking amounts, steering angles and so forth. In the autonomous driving control processing, the autonomous driving control unit 12 creates a running plan along a pre-specified target route on the basis of environment information of the vehicle and map information, and controls driving such that the vehicle runs independently in accordance with the created running plan.

The autonomous driving control unit 12 may memorize information representing running operation states of the vehicle and may output information representing the memorized running operation states of the vehicle. The information representing running operation states of the vehicle is information representing manual driving mode in which the vehicle is manually driven by an occupant and information representing autonomous driving mode in which the vehicle is caused to run automatically by the autonomous driving control unit 12.

The autonomous driving control unit 12 also outputs predetermined information relating to driving support of the vehicle. An example of this predetermined information includes information indicating the start of autonomous driving control processing, information indicating the end of autonomous driving control processing, and the like.

For example, during manual driving mode in which the vehicle is driven by an occupant, the autonomous driving control unit 12 may start autonomous driving control processing automatically in accordance with movements of the vehicle and conditions of the surroundings to support driving of the vehicle by the occupant. In this case, the autonomous driving control unit 12 outputs information indicating the start of the autonomous driving control processing. In a case of switching from manual driving mode to autonomous driving mode due to a command from the occupant, the autonomous driving control unit 12 outputs information indicating that responsibility for driving has been transferred, that is, the predetermined information indicating the start of autonomous driving control processing.

During execution of the autonomous driving control processing, the autonomous driving control unit 12 may automatically end (leave) the autonomous driving control processing in accordance with movements of the vehicle and conditions of the surroundings and execute processing to prompt manual driving mode of the vehicle. At this time, the autonomous driving control unit 12 outputs the information indicating the end of autonomous driving control processing in order to prompt manual driving mode of the vehicle. In a case of switching from autonomous driving mode by the autonomous driving control processing to manual driving mode driven by an occupant because of a command from the occupant, the autonomous driving control unit 12 outputs information indicating that responsibility for driving has been transferred, that is, the predetermined information indicating the end of autonomous driving control processing.

The autonomous driving control unit 12 may include a communication device that exchanges information on surroundings and the like between the vehicle and the exterior of the vehicle. A communication device that receives road conditions by road-to-vehicle communications, such as a wireless communications device based on DSRC (dedicated short-range communications) narrow-band communications or the like, can be mentioned as an example of the communication device. Surroundings information is information representing the road conditions received by road-to-vehicle communications and may include information representing curves of running lanes, shapes and conditions such as road surface camber and the like of lanes and roads, positional relationships of the vehicle with respect to lanes, positional relationships with other vehicles during running, traffic levels in the surroundings and so forth. As an example of equipment for obtaining surroundings, the autonomous driving control unit 12 may include a navigation system.

The surroundings detection device 14 includes plural types of sensors, surroundings imaging cameras and the like, and detects surroundings of the vehicle in order for the autonomous driving control unit 12 to perform autonomous driving. The surroundings detection device 14 detects, for example, image information from the surroundings imaging cameras, obstacle information from a radar, obstacle information from LIDAR (laser imaging detection and ranging) and the like to be surroundings information of the vehicle. The surroundings include, for example, the positions of white lines of a driving lane relative to the vehicle, the position of the lane center, the road width, the road shape, conditions of obstacles near the vehicle, and so forth. The road shape includes, for example, curvature of the driving lane, estimated gradient changes and undulations of a usable road surface predicted by the sensors, and the like. Conditions of obstacles near the vehicle include, for example, information distinguishing fixed obstacles from moving obstacles, positions of the obstacles relative to the vehicle, movement directions of the obstacles relative to the vehicle, relative speeds of the obstacles relative to the vehicle, and so forth.

Figure 3A:
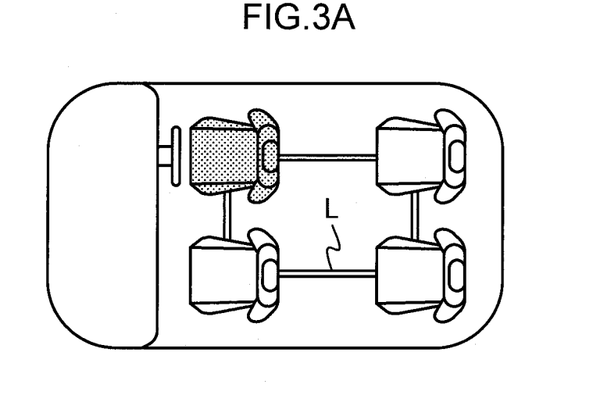
FIG. 3A is a diagram showing a usual state in which positions and facing directions of seats are not changed.
Figure 3B:
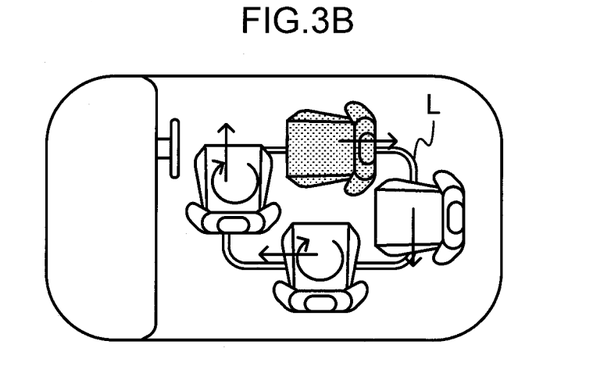
FIG. 3B is a diagram showing a condition in which the positions and facing directions of the seats are being changed at a time of switching to autonomous driving mode.
Figure 3C:
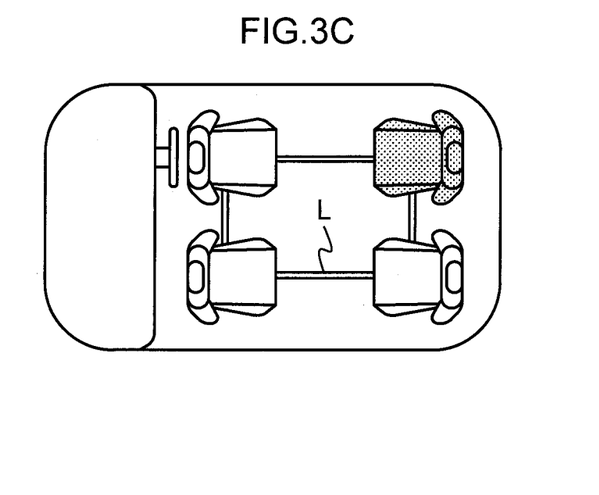
FIG. 3C is a diagram showing a mutually facing seating state.
Figure 4A:
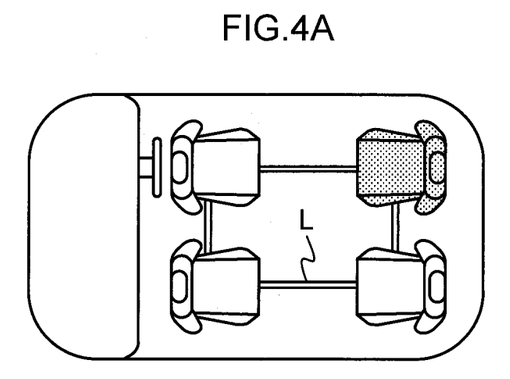
FIG. 4A is a diagram showing the mutually facing seating state.
Figure 4B:
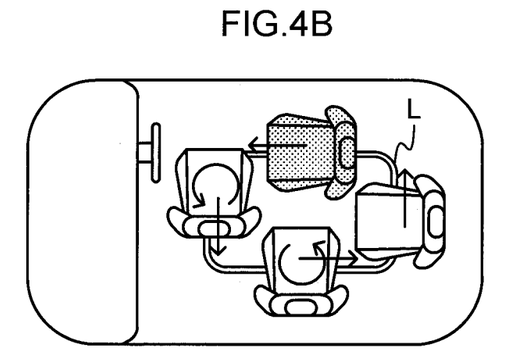
FIG. 4B is a diagram showing a condition in which the positions and facing directions of the seats are being changed at a time of switching to manual driving mode.
Figure 4C:
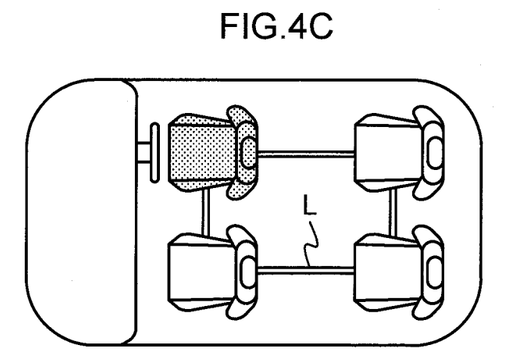
FIG. 4C is a diagram showing the usual state.

The seat position changing unit 28 includes actuators and the like for changing the facing directions and positions of each of the plural number (four in the present exemplary embodiment) of seats provided in the vehicle whose respective positions and facing directions with respect to the vehicle can be changed. In other words, seat arrangements can be changed by the seat position changing unit 28. In the present exemplary embodiment, two lines of seats are arranged in both the vehicle width direction and the vehicle front-and-rear direction; the seat position changing unit 28 changes the positions and facing directions of these seats. For example, at a time of autonomous driving mode, from a usual state (the state in FIG. 3A in which all of the seats are oriented in the vehicle progress direction), the seat position changing unit 28 turns the facing directions of each of the seats disposed at the vehicle front and rear that are at the opposite side in the vehicle width direction from the side at which a pre-specified driving position is disposed, and moves all the seats in the clockwise direction along a rail L (FIG. 3B). As a result, the seats may be put into a seat arrangement that is a mutually facing seating state in which seats at the vehicle front side are oriented the opposite way to the vehicle progress direction (FIG. 3C) and seats at the vehicle rear side are oriented to the vehicle progress direction. The example in FIG. 3A to FIG. 3C describes a case in which the rail L along which the seats move is provided and the actual positions of the seats relative to the vehicle can be changed along the rail L. On the other hand, at a time of switching to manual driving mode, from the seat arrangement of the mutually facing seating state shown in FIG. 4A, the seat position changing unit 28 turns the facing direction of each of the seats disposed at the vehicle front side and moves all the seats in the counterclockwise direction along the rail L (FIG. 4B). As a result, the seats may be returned to the seat arrangement of the usual state, as shown in FIG. 4C. When the seat position changing unit 28 changes the facing directions and positions of the seats, the positions and facing directions are changed such that the seats do not interfere with one another. In FIG. 3A to FIG. 4C, the seat on which a driver is sitting is shaded.

The communications control unit 30 communicates with an external server or the like in the cloud 40 or the like via a network such as a mobile telephony communications network or the like. Accordingly, the communications control unit 30 can exchange various kinds of information with the external server and the like.

In the present exemplary embodiment, the term "pre-specified driving position" refers to a pre-specified position among the four seat positions within the vehicle at which operation systems for steering and the like are provided. The pre-specified driving position corresponds to the driving position of an ordinary vehicle. The pre-specified driving position corresponds to a position at the road middle side of the vehicle front side, for a case in which a right-hand drive vehicle is running along a left-side carriageway of a road.

A vehicle occupant information acquisition device 10 according to the present exemplary embodiment enables the autonomous driving mode as described above, and the positions and facing directions of the seats are changed by the seat position changing unit 28. However, when the vehicle is transferring from autonomous driving mode to manual driving mode, the previous driver may not be suitable for driving.

Accordingly, in the present exemplary embodiment, the autonomous driving control unit 12 acquires various kinds of information about occupants from the occupants and then alerts an occupant who is suitable to be a driver. For example, the autonomous driving control unit 12 acquires information relating to the driving suitability of the occupants, including at least one of personal information including whether or not an occupant is licensed to drive, a state of alcoholic influence, a state of physical condition, the facing direction and position of the occupant's seat, driving skill on the travel route, a driving distribution and whether or not the occupant wants to drive, and then selects and alerts an occupant who is suitable to drive.

To be specific, in the present exemplary embodiment the autonomous driving control unit 12 uses pre-specified evaluation values to evaluate determination conditions (whether or not an occupant is licensed to drive, a state of alcoholic influence, a state of physical condition, the facing direction and position of the seat, driving skill on the travel route, driving distribution and willingness to drive) and selects an occupant who is suitable for driving among the occupants who are riding. The determination conditions mentioned above are not necessarily all included; appropriate combinations may be employed. For example, the evaluation may be performed using determination conditions excluding the facing direction and position of the seat, and alternative combinations may be employed.

Figure 5:
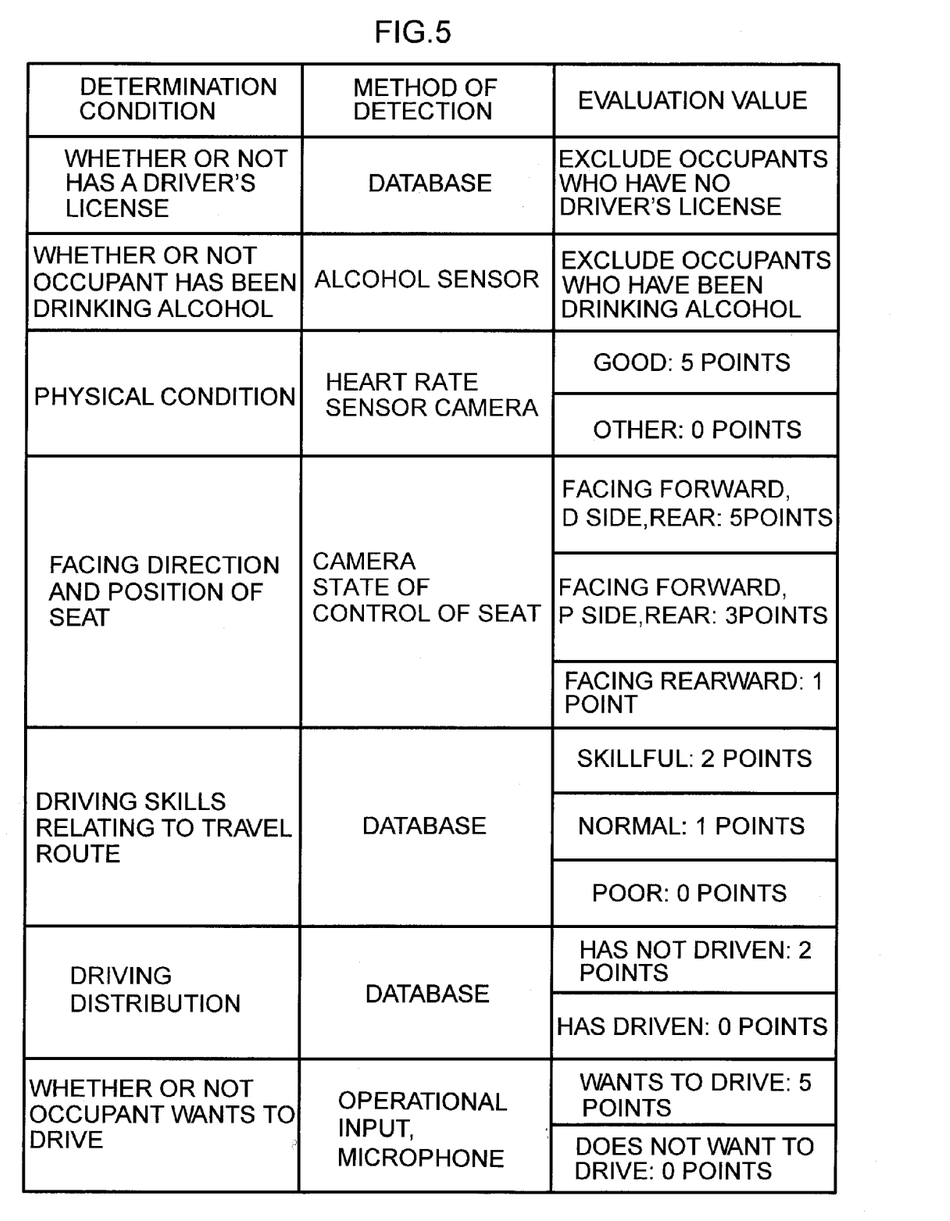
FIG. 5 is a table showing an example of conditions, method of detections and evaluation values for evaluating occupants who are suitable to drive.

In the present exemplary embodiment, as illustrated in FIG. 5, whether or not occupants are licensed to drive is registered in advance in the database 26, an occupant is identified, and the corresponding information on whether or not that occupant is licensed to drive is read from the database 26. If an occupant is not licensed to drive, they are excluded from candidates to be driver. For identification of an occupant at this time, the occupant may be identified by, for example, using facial recognition technology from an image captured by the cameras 18 or the like, or the occupant may be identified by personal information or the like of the occupants sitting on the seats being entered by an occupant operating the display/control panel 24.

For the state of alcoholic influence of an occupant, information representing the state of alcoholic influence is acquired from the occupant by acquiring detection results from the alcohol sensor 16 and detecting the presence or absence of alcohol. If the occupant is under alcoholic influence, similarly to the case in which an occupant is not licensed to drive, the occupant is excluded from candidates to be driver.

For the state of physical condition of an occupant, information representing the state of physical condition is acquired from the occupant by acquiring detection results from the heart rate sensor 22 and detecting the state of physical condition. For example, the state of physical condition of the occupant is detected by determining whether their heart rate is in a pre-specified range of heart rates in usual conditions or the like. Further, the state of physical condition of an occupant may be detected from images captured by the cameras 18, by detecting whether or not the occupant's eyes are open and by detecting a blinking rate, a facial expression and the like. In the present exemplary embodiment, if the state of physical condition is good, a weighting of points is applied, but if the state of physical condition is not good, a weighting of zero points is applied. For example, if the heart rate is a heart rate within the pre-specified range, in addition to which the eyes are in the open state, the blinking rate is within a pre-specified range of blinking rates, and the occupant has a pre-specified facial expression, the state of physical condition is determined to be good.

Figure 6:
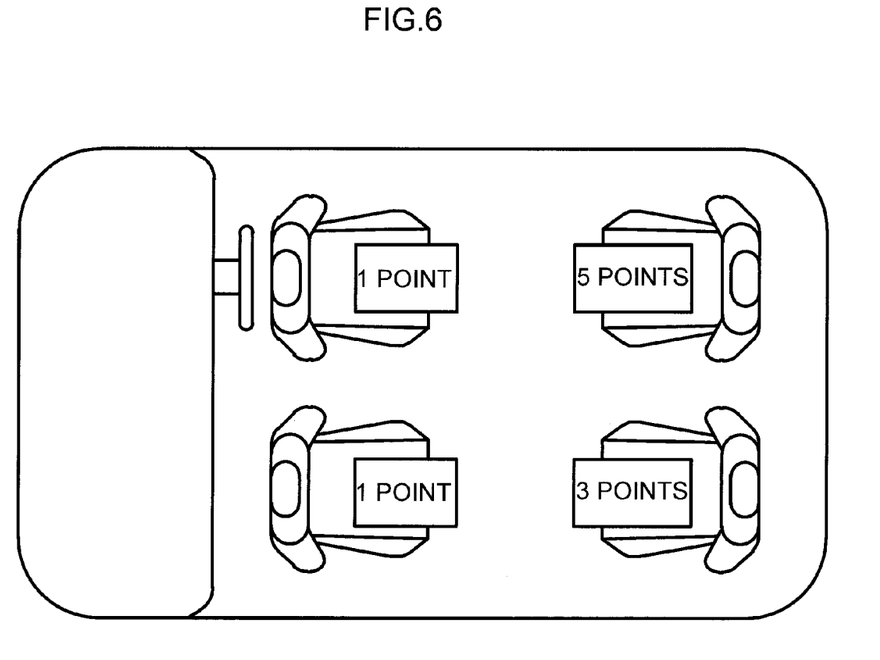
FIG. 6 is a diagram for describing evaluation values according to the facing directions and positions of the seats.

For the facing direction and position of a seat, the cameras 18 may function as a detection unit and captured images from the cameras 18 may be acquired to detect the facing direction and position of the seat, or a control state of the seats according to the seat position changing unit 28 may be acquired to detect the facing direction and position of the seat. In the present exemplary embodiment, as illustrated in FIG. 6, if the seat is facing in the vehicle progress direction and is disposed at the vehicle rear side of the side of the driving position in the vehicle width direction ("forward facing, D side, rear"), a weighting of five points is applied. If the seat is facing in the vehicle progress direction and is disposed at the vehicle rear side of the side opposite to the side of the driving position in the vehicle width direction ("forward facing, P side, rear"), a weighting of three points is applied. A weighting of one point is applied for the other seats facing the opposite way to the vehicle progress direction ("rearward facing"). Because it takes more time for a driver to switch their mental attitude and switch their postural attitude and to become acquainted with the movements and situation of the vehicle if the facing direction of their seat is being changed, an occupant who is facing in the vehicle progress direction is given greater weighting as being suitable to be the driver. However, the weighting is slightly reduced for a seat that, even though oriented to the vehicle progress direction, is distant from the driving position. The letter "D" herein refers to the driving position (driving seat), and the letter "P" refers to the position opposite from the driving position (the front passenger seat).

For driving skill on the travel route, information representing driving skills of occupants is recorded in the database 26 beforehand. When an occupant is identified, the corresponding information representing the driving skill of the occupant is read from the database 26. If the occupant is skillful at driving, a weighting of two points is applied, if the occupant is at an normal level, a weighting of one point is applied, and if the occupant is at a poor level, a weighting of zero points is applied.

For driving distribution, driving history information has previously been memorized in the database 26. When an occupant is identified, the corresponding driving history information of the occupant is read from the database 26 to serve as information representing the driving distribution. If there is no driving history and the occupant has not yet driven ("yet to drive"), a weighting of two points is applied; if there is a driving history and the occupant has already driven, a weighting of zero points is applied. These weightings may be specified to allow for, for example, the father of a family doing most of the driving or the like.

For willingness to drive (whether or not the occupants want to drive), information representing willingness to drive is acquired from the occupants by entry operations through the display/control panel 24, detection of willingness to drive by voice recognition through the microphone 20, or the like. If the occupant is willing, a weighting of five points is applied. If the occupant is not willing, a weighting of zero points is applied.

Then, when the autonomous driving control unit 12 is switching from autonomous driving mode to manual driving mode, occupants who are suitable to drive are evaluated by calculating totals of the evaluation values described above. The example described above illustrates a case in which occupants with larger evaluation values are more suitable to drive.

If there are tied totals of the evaluation values, higher priority may be given to the evaluation value of a pre-specified condition such as, for example, the state of physical condition, the facing direction and position of the seat or the like. The point values of the weightings are given as an example; the above point values are not limiting. Although the above description illustrates an example in which an occupant with more points in their evaluation value is more suitable to drive, the evaluation values may conversely be specified such that an occupant with a smaller evaluation value is more suitable to drive.

Now, operation and effects of the present exemplary embodiment are described below.

Figure 7:
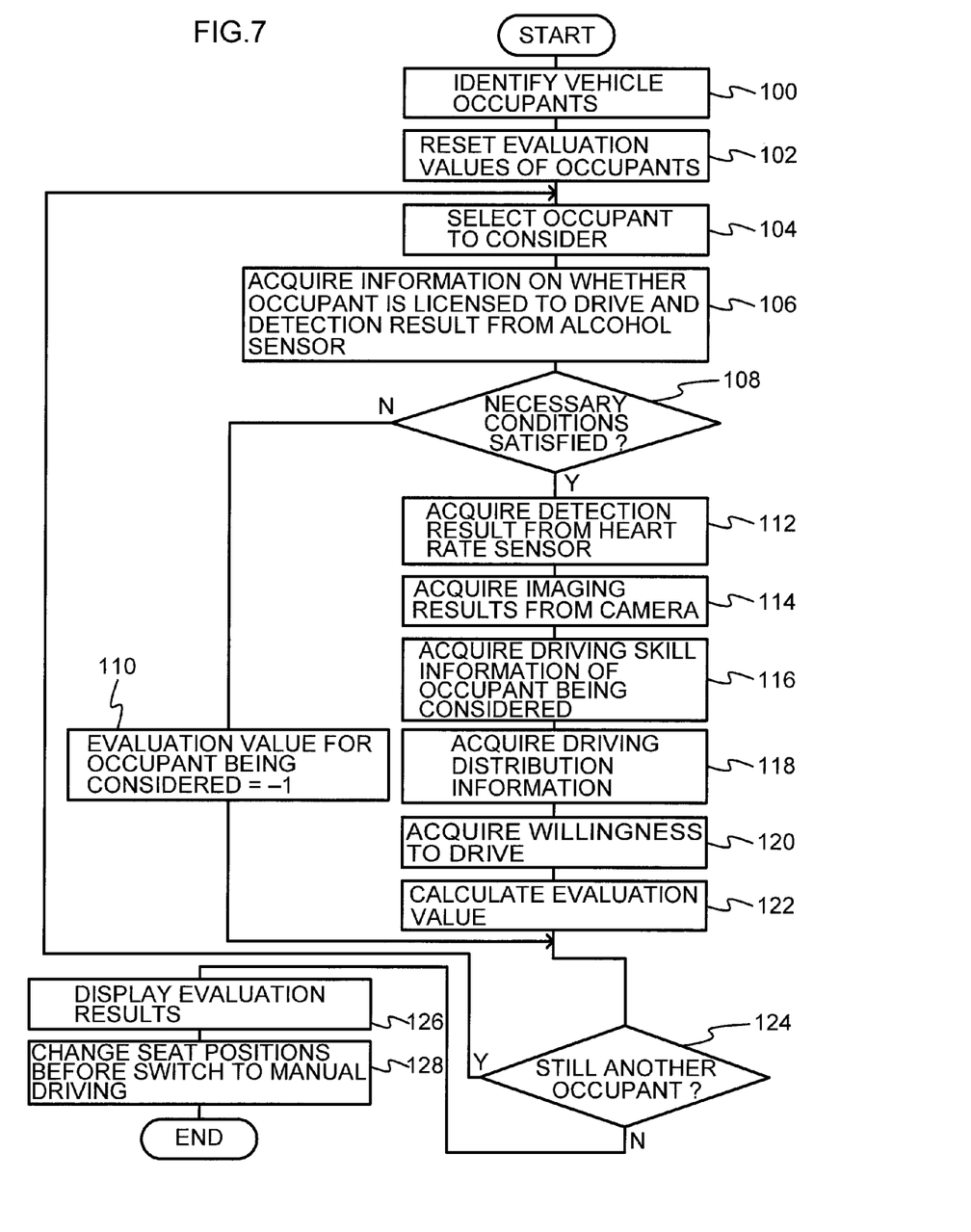
FIG. 7 is a flowchart showing the flow of processing that selects and alerts an occupant who is suitable to drive, which is executed by an automatic driving control unit of the vehicle occupant information acquisition device according to the present exemplary embodiment.

Hereinafter, specific processing that is executed by the autonomous driving control unit 12 of the vehicle occupant information acquisition device 10 according to the present exemplary embodiment is described. FIG. 7 is a flowchart showing the flow of processing that selects and alerts an occupant who is suitable to drive, which is executed by the autonomous driving control unit 12 of the vehicle occupant information acquisition device 10 according to the present exemplary embodiment. The processing of FIG. 7 starts, for example, when the autonomous driving control unit 12 outputs the information indicating the end of the autonomous driving control processing, that is, when the autonomous driving control unit 12 performs control to switch from autonomous driving mode to manual driving mode.

In step 100, occupants riding in the vehicle are identified by the autonomous driving control unit 12, and the autonomous driving control unit 12 proceeds to step 102. For example, the autonomous driving control unit 12 employs facial recognition technology and uses captured images from the cameras 18 to identify the riding occupants. Further, the riding occupants may be identified by the occupants sitting on the seats using the display/control panel 24 to enter their identities while riding in the vehicle or the like.

In step 102, the autonomous driving control unit 12 resets evaluation values of the occupants and then proceeds to step 104. The evaluation values are values for evaluating occupants who are suitable to drive. In the present exemplary embodiment, the evaluation values represent totals of the weighting point values described above.

In step 104, the autonomous driving control unit 12 selects an occupant to consider and then proceeds to step 106. That is, the autonomous driving control unit 12 selects one occupant to evaluate among the riding occupants.

In step 106, the autonomous driving control unit 12 acquires information on whether the occupant is licensed to drive from the database 26 and acquires detection results from the alcohol sensor 16, and then proceeds to step 108.

In step 108, the autonomous driving control unit 12 makes a determination as to whether necessary conditions for driving are satisfied for the occupant being considered. In this determination, on the basis of the information acquired in step 106, the autonomous driving control unit 12 determines whether or not the occupant is licensed to drive and unaffected by alcoholic influence. If the result of this determination is negative, the autonomous driving control unit 12 proceeds to step 110, and if the result is affirmative, the autonomous driving control unit 12 proceeds to step 112.

In step 110, the evaluation value of the occupant being considered is set to −1, the occupant is excluded from evaluation, and the autonomous driving control unit 12 proceeds to step 124.

In step 112, the autonomous driving control unit 12 acquires detection results from the heart rate sensor 22 for the occupant being considered, and then proceeds to step 114.

In step 114, the autonomous driving control unit 12 acquires imaging results in which the occupant being considered is imaged by the cameras 18, and then proceeds to step 116.

In step 116, the autonomous driving control unit 12 acquires driving skill information of the occupant being considered from the database 26, and then proceeds to step 118.

In step 118, the autonomous driving control unit 12 acquires information on driving distribution for the occupant being considered from the database 26, and then proceeds to step 120.

In step 120, the autonomous driving control unit 12 acquires willingness to drive information according to entry operations at the display/control panel 24, voice recognition by the microphone 20 or the like, and then proceeds to step 122.

In step 122, the autonomous driving control unit 12 calculates the evaluation value of the occupant being considered, and then proceeds to step 124. In the present exemplary embodiment, the autonomous driving control unit 12 calculates the evaluation value by adding the respective weightings shown in FIG. 5, which are described above, according to the acquired information.

In step 124, the autonomous driving control unit 12 makes a determination as to whether there is still another occupant who has not been evaluated. If the result of this determination is affirmative, the autonomous driving control unit 12 returns to step 104 and repeats the processing described above. If the result is negative, the autonomous driving control unit 12 proceeds to step 126.

In step 126, the autonomous driving control unit 12 displays evaluation results at the display/control panel 24 and then proceeds to step 128. For example, the autonomous driving control unit 12 alerts the occupant who is suitable for the subsequent manual driving by displaying the riding occupants at the display/control panel 24 in order from the highest evaluation value, which is the order of suitability for driving. If there is an occupant whose evaluation value is −1, that occupant does not satisfy the necessary conditions for driving. Therefore, that occupant is excluded from the display or an alert is given by the display or the like indicating that the occupant does not satisfy the conditions. Thus, when there is a switch to manual driving mode, an occupant having driving suitability is enabled to drive by the occupant who is suitable to drive being selected and alerted. By the occupant who has been alerted performing driving, the switch from autonomous driving mode to manual driving mode may be implemented safely.

In step 128, before switching from autonomous driving mode to manual driving mode, the autonomous driving control unit 12 controls the seat position changing unit 28 so as to move the alerted occupant to the driving position, and then ends this sequence of processing. For example, when the autonomous driving control unit 12 outputs the information indicating the end of the autonomous driving control processing, the autonomous driving control unit 12 controls the seat position changing unit 28 such that the seat on which the occupant who is most suitable to drive is sitting is set to a position and facing direction suitable for driving. Thus, the occupant who is suitable to drive may be moved to the driving position. At this time, the autonomous driving control unit 12 may control the seat position changing unit 28 provided that a command is not given, by operation of the display/control panel 24 or the like, that the alerted occupant who is suitable to drive will not be the driver. If such an operation is performed, control may be performed to move the second most suitable occupant to the driving position. Further, if an operation is performed to specify another occupant as the driver, control may be performed so as to move the corresponding occupant to the driving position.

Figure 8:
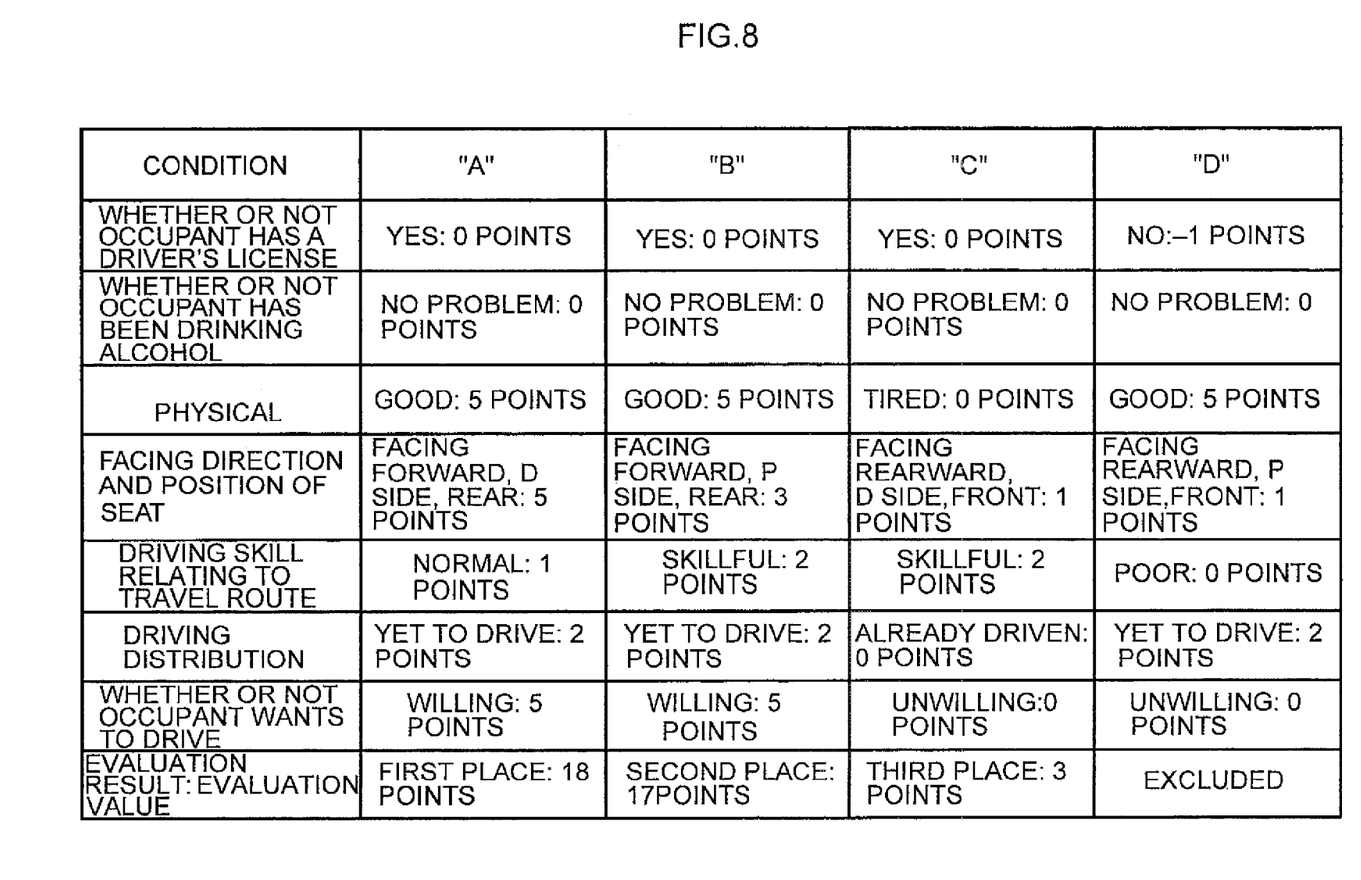
FIG. 8 is a table showing an information example relating to driving suitability of actual occupants with respect to various conditions, for four people named "A" to "D"

Now, an example illustrated in FIG. 8, in which four people "A" to "D" are riding in a vehicle, is specifically described as an example of the selection of an occupant who is suitable to drive by the processing described above. FIG. 8 is a table showing an example of information relating to the driving suitability of actual occupants in relation to the respective conditions for the four people "A" to "D". Of the facing directions and positions of the seats in FIG. 8, "Facing forward, D side, rear" represents a seat being oriented to the vehicle progress direction and disposed at the vehicle rear side of the side in the vehicle width direction at which the driving position is disposed. "Facing forward, P side, rear" represents a seat being oriented to the vehicle progress direction and disposed at the vehicle rear side of the opposite side in the vehicle width direction from the driving position. "Facing Rearward, D side, front" represents a seat being oriented the opposite way to the vehicle progress direction and disposed at the vehicle front side of the side in the vehicle width direction at which the driving position is disposed. "Facing rearward, P side, front" represents a seat being oriented the opposite way to the vehicle progress direction and disposed at the vehicle front side of the opposite side in the vehicle width direction from the driving position.

In the example in FIG. 8, "A" is licensed to drive, has no problem with alcoholic influence, has a good state of physical condition, is in the seat whose facing direction and position are facing forward, D side, rear, has normal driving skill for the travel route, is yet to drive in the driving distribution, and is willing to drive. Thus, the total of the evaluation values according to the processing described above is calculated to be 18 points.

"B" is licensed to drive, has no problem with alcoholic influence, has a good state of physical condition, is in the seat whose facing direction and position are forward facing, P side, rear, is skillful in driving skill for the travel route, is yet to drive in the driving distribution, and is willing to drive. Thus, the total of the evaluation values according to the processing described above is calculated to be 17 points.

"C" is licensed to drive, has no problem with alcoholic influence, has a state of physical condition that is "tired", is in the seat whose facing direction and position are rearward facing, D side, front, is skillful in driving skill for the travel route, has already driven in the driving distribution, and is not willing to drive. Thus, the total of the evaluation values according to the processing described above is calculated to be 3 points.

"D" is not licensed to drive. Therefore, the total evaluation value is −1 point, and "D" is excluded from candidates to be driver.

In the example in FIG. 8, a case is illustrated in which "A" and "B" have substantially similar totals of the evaluation values but, because the facing direction and position of the seat of "A" is slightly more suitable for driving, "A" is selected as the first candidate, "B" is the second candidate and "C" is the third candidate. The selection results are displayed at the display/control panel 24. Thus, the occupant who is suitable to drive may be alerted during the switch to manual driving mode.

In the exemplary embodiment described above, an occupant who is suitable to drive is selected and alerted, and control is performed so as to move the corresponding occupant to the driving position for the time of manual control. However, a configuration may be made such that step 128 is omitted and the occupant who is suitable to drive is simply alerted. In this case, the seat position changing unit 28 may be omitted and the occupants themselves may move and change their sitting positions and the facing directions of the seats or the like.

In the above exemplary embodiment, a case in which the method for alerting the occupant who is suitable to drive is a display at the display/control panel 24, has been described. However, an alerting method is not limited thereto. For example, the occupant may be alerted by a voice message, or an alert lamp or the like may be provided at each seat and the occupant who is suitable to drive alerted by the lamp or the like lighting up.

In the above exemplary embodiment, a case in which the vehicle has four seats, has been described. However, the present disclosure is not limited to four seats. For example, a vehicle may be installed with two seats, and a vehicle may be installed with five seats or more.

Figure 9A:
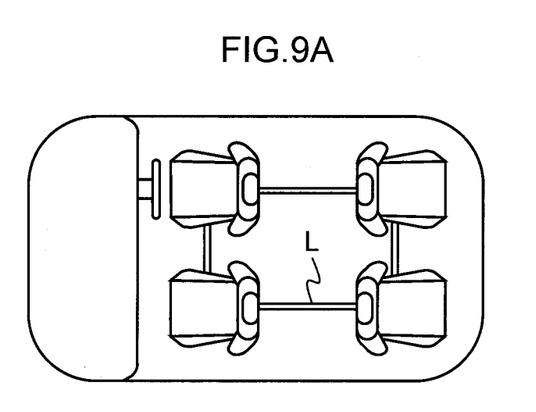
FIG. 9A is a diagram showing a seat arrangement example in a state in which seats at the vehicle front side are oriented in the vehicle progress direction and seats at the vehicle rear side are oriented the opposite way to the vehicle progress direction.
Figure 9B:
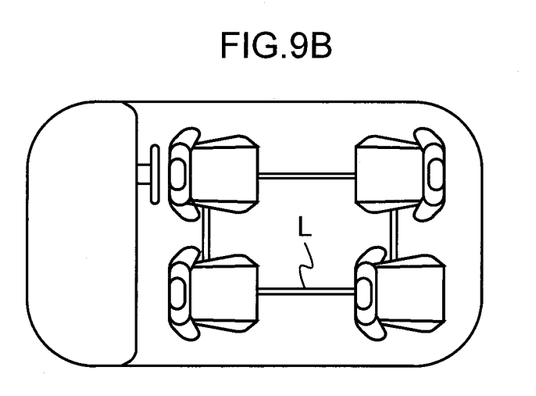
FIG. 9B is a diagram showing a seat arrangement in which all but one of the seats are oriented the opposite way to the vehicle progress direction.
Figure 9C:
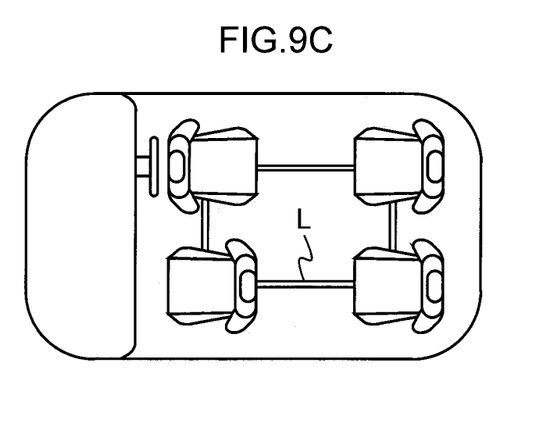
FIG. 9C is a diagram showing a seat arrangement in which only one of the seats is oriented the opposite way to the vehicle progress direction.

In the above exemplary embodiment, a case in which the examples of changeable seat arrangements are a usual state (the state in which each seat is oriented to the vehicle progress direction) and a mutually facing seating state, has seen described. However, the seat arrangements are not limited thereto. For example, as shown in FIG. 9A, the seat arrangement may be changed to a state in which seats at the vehicle front side are oriented to the vehicle progress direction and seats at the vehicle rear side are oriented the opposite way to the vehicle progress direction. Alternatively, as shown in FIG. 9B, the seats may be changed to a seat arrangement in which all but one of the seats are oriented the opposite way to the vehicle progress direction. Alternatively, as shown in FIG. 9C, the seats may be changed to a seat arrangement in which only one of the seats is oriented the opposite way to the vehicle progress direction. Alternatively, the seats may be changed to other seat arrangements.

Figure 10A:
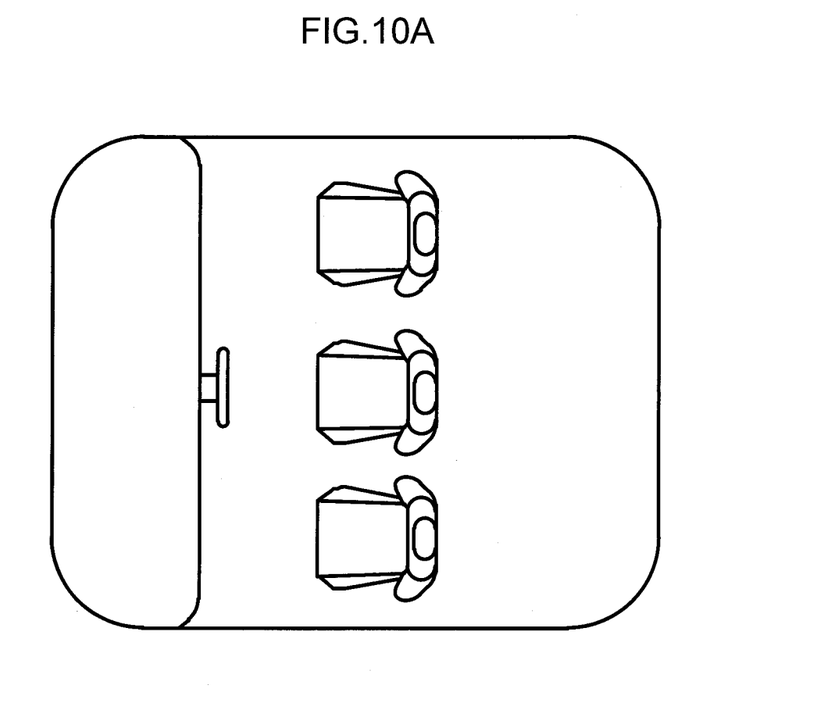
FIG. 10A is a diagram showing plural seats arranged in a line in a vehicle width direction.
Figure 10B:
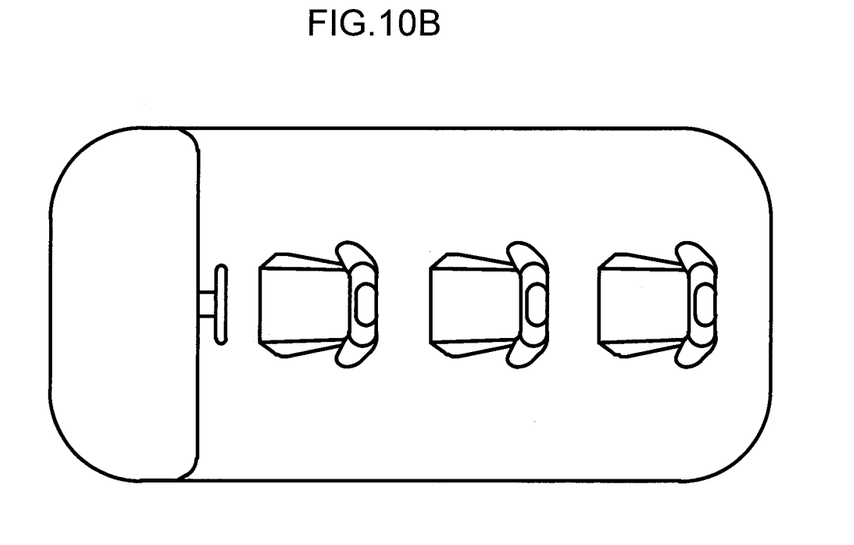
FIG. 10B is a diagram showing plural seats arranged in a line in a vehicle front-and-rear direction.

In the above exemplary embodiment, a case in which the four seats are arranged in two lines in each of the vehicle width direction and the vehicle front-and-rear direction, has been described. However, arrangements of plural seats are not limited thereto. For example, the plural seats may be arranged in rows of two in the vehicle width direction and in three lines in the vehicle front-and-rear direction, the plural seats may be arranged in rows of three in the vehicle width direction and in two lines in the vehicle front-and-rear direction, the plural seats may be arranged in a row of two in the vehicle width direction at the vehicle front side and a row of three in the vehicle width direction at the vehicle rear side, or the like. Alternatively, as shown in FIG. 10A, plural seats may be arranged in a single line in the vehicle width direction, or as shown in FIG. 10B, the plural seats may be arranged in a single line in the vehicle front-and-rear direction. In these cases, similarly to the exemplary embodiment described above, it is sufficient to select and alert an occupant who is suitable to drive. Further, the alerted occupant may be moved to the driving position.

The processing in FIG. 7 that is executed by the autonomous driving control unit 12 according to the exemplary embodiment described above may be software processing that is implemented by a computer executing a program, and the processing may be implemented in hardware. Alternatively, the processing may combine both software and hardware. Further, if the processing is implemented in software, the program may be memorized in any of various storage media and distributed. The processing in FIG. 7 is described as processing that is executed by the autonomous driving control unit 12 within the vehicle, but this is not limiting. For example, the processing may be executed at an external server or the like outside the vehicle.

The present disclosure is not limited by the above. In addition to the above, it is clear that numerous modifications may be embodied within a technical scope not departing from the gist of the disclosure.

What is claimed is:

1. A vehicle occupant information acquisition device comprising:

a microcomputer configured to control a vehicle to switch between an autonomous driving mode and a manual driving mode of the vehicle;

acquisition means for acquiring, from two or more vehicle occupants riding in the vehicle, a plurality of information relating to driving suitability of each of the vehicle occupants, the plurality of information being supplied to the microcomputer; and an indicator coupled to and controlled by the microcomputer, wherein in a case in which the microcomputer is switching the vehicle from the autonomous driving mode to the manual driving mode, the microcomputer causes the indicator to alert one of the vehicle occupants who is determined to be suitable to drive the vehicle based on the plurality of information acquired by the acquisition means that the one of the vehicle occupants has been selected as the driver of the vehicle in the manual driving mode, wherein the microcomputer is configured to select, and cause the indicator to alert, the one of the vehicle occupants who is suitable to drive by calculating an evaluation value for each of the vehicle occupants by adding respective weightings based on the plurality of information acquired by the acquisition means and by evaluating each of the vehicle occupants based on the calculated evaluation value for each of the vehicle occupants.

2. The vehicle occupant information acquisition device according to claim 1, wherein the information relating to driving suitability of the vehicle occupants acquired by the acquisition means includes at least one of: personal information including whether or not the vehicle occupants are licensed to drive; information representing a state of alcoholic influence of the vehicle occupants; information representing a state of physical condition of the vehicle occupants; driving skill information of the vehicle occupants; driving history information of the vehicle occupants; information representing a driving distribution of the vehicle occupants; and information on willingness of the vehicle occupants to drive.

3. The vehicle occupant information acquisition device according to claim 1, further comprising a detector configured to detect respective positions and facing directions of a plurality of seats of the vehicle whose positions and facing directions relative to the vehicle are respectively changeable, wherein, in a case in which the microcomputer is switching the vehicle from the autonomous driving mode to the manual driving mode, the microcomputer causes the indicator to alert the one of the vehicle occupants who is suitable to drive based on the information acquired by the acquisition means and detection results of the detector.

4. A vehicle control system comprising:

the vehicle occupant information acquisition device according to claim 3; and actuators, coupled to the plurality of seats, that change the respective positions and facing directions of the plurality of seats;

wherein the microcomputer controls the actuators so as to set a seat on which the one of the vehicle occupants determined to be suitable to drive is sitting to a position and facing direction suitable for driving.

5. The vehicle occupant information acquisition device according to claim 1, wherein the information relating to driving suitability of the vehicle occupants acquired by the acquisition means includes information as to whether or not the vehicle occupants are licensed to drive.

6. The vehicle occupant information acquisition device according to claim 1, wherein the information relating to driving suitability of the vehicle occupants acquired by the acquisition means includes information representing a state of alcoholic influence of the vehicle occupants.

7. The vehicle occupant information acquisition device according to claim 1, wherein the information relating to driving suitability of the vehicle occupants acquired by the acquisition means includes information representing a state of physical condition of the vehicle occupants.

8. The vehicle occupant information acquisition device according to claim 1, wherein the information relating to driving suitability of the vehicle occupants acquired by the acquisition means includes driving skill information of the vehicle occupants.

9. The vehicle occupant information acquisition device according to claim 1, wherein the information relating to driving suitability of the vehicle occupants acquired by the acquisition means includes driving history information of the vehicle occupants.

10. The vehicle occupant information acquisition device according to claim 1, wherein the information relating to driving suitability of the vehicle occupants acquired by the acquisition means includes information representing a driving distribution of the vehicle occupants.

11. The vehicle occupant information acquisition device according to claim 1, wherein the information relating to driving suitability of the vehicle occupants acquired by the acquisition means includes information on willingness of the vehicle occupants to drive.

12. A vehicle occupant information acquisition device comprising:

a microcomputer configured to control a vehicle to switch between an autonomous driving mode and a manual driving mode of the vehicle, the microcomputer configured to:

acquire, from two or more vehicle occupants riding in the vehicle, a plurality of information relating to driving suitability of each of the vehicle occupants, and in a case in which the microcomputer is switching the vehicle from the autonomous driving mode to the manual driving mode:

calculate an evaluation value for each of the vehicle occupants by adding respective weightings based on the acquired plurality of information, evaluate each of the vehicle occupants based on the calculated evaluation value for each of the vehicle occupants, and select and alert one of the vehicle occupants who is determined to be suitable to drive the vehicle based on the evaluation.

13. A non-transitory computer-readable medium storing a control program causing a computer, configured to control a vehicle to switch between an autonomous driving mode and a manual driving mode of the vehicle, to execute a process for vehicle occupant information acquisition, the process comprising:

acquiring, from two or more vehicle occupants riding in the vehicle, a plurality of information relating to driving suitability of each of the vehicle occupants, and in a case in which the computer is switching the vehicle from the autonomous driving mode to the manual driving mode:

calculating an evaluation value for each of the vehicle occupants by adding respective weightings based on the acquired plurality of information, evaluating each of the vehicle occupants based on the calculated evaluation value for each of the vehicle occupants, and selecting and alerting one of the vehicle occupants who is determined to be suitable to drive the vehicle based on the evaluating.

* * * * *